# United States Patent Office 2,873,190
Patented Feb. 10, 1959

2,873,190

DETOXIFYING COTTONSEED MEAL

William H. King, Metairie, La., assignor to the United States of America as represented by the Secretary of Agriculture No Drawing. Application October 27, 1955
Serial No. 543,282

9 Claims. (Cl. 99—2)

(Granted under Title 35, U. S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to detoxifying cottonseed meal that contains free gossypol. More particularly, this invention provides a relatively simple and economical detoxification process which can be carried out in the usual oilseed processing equipment to produce, by a single treatment, a meal having 0.04% or less of free gossypol, and by further treatment, a meal having less than about 0.01%.

As used herein, the term "cottonseed meal" refers to meals produced by pressing and/or solvent extracting cottonseed particles to remove all but from about 1 to 6% of their oil. The preferred cottonseed meals contain a large proportion of the cottonseed proteins in a nutritive form and are produced by extracting the oil from raw cottonseed flakes by processes which do not involve a severe heating or "cooking" of the solid components of cottonseed at a relatively high temperature in the presence of moisture. These meals, however, usually contain from about 0.05 to 1.5% free gossypol. It is presently believed that for safe feeding to broilers a cottonseed meal should contain not more than about 0.4% free gossypol, and that for unlimited feeding to swine and poultry, a meal should contain not more than about 0.01% free gossypol.

In general, according to the invention, a process is provided for reducing the free gossypol content of a desolventized, substantially oil-free, organic solvent-extracted, preferably hexane-extracted, cottonseed meal, such as that described above, that is, containing in excess of about .04% free gossypol, to a free gossypol content not exceeding about .01%. The process involves forming a mixture containing the said meal, aqueous alkali, preferably sodium hydroxide, and a hot water-miscible, volatile organic solvent, preferably 2-propanol. The quantity of the aqueous alkali used in the mixture is that amount sufficient to adjust the pH of the wet meal to at least about 7, a pH of about from 7 to 10 being preferred, and the quantity of the water-miscible solvent used in the mixture is that amount sufficient to adjust the moisture content of the meal to about from 5 to 14%. Thereafter, the meal is separated from the said mixture, as by filtration, and then extracted, preferably a plurality of times, with a hot water-miscible volatile organic solvent until the free gossypol content of the meal does not exceed about .01%. The resulting meal is then freed of liquid and desolventized. The hot water-miscible, volatile organic solvents are inert to cottonseed, cottonseed oil, and water, and are capable of removing water from the meal, of rupturing the pigment glands contained in the meal, and of extracting the pigments including gossypol released as a result of such rupture of the pigment glands.

The liquid removed from the wet meal contains volatile organic solvent, water and minor amounts of gossypol, cottonseed oil, sugars and other soluble components of cottonseed. The organic solvent can readily be distilled and recovered for re-use while the soluble components may be isolated as byproducts.

As a result of the above treatment the pigment glands are ruptured and gossypol and related pigments are released. These pigments rapidly combine with cottonseed meal constituents to form non-toxic "bound" derivatives.

In contacting the meal with aqueous alkali and water-soluble volatile organic solvent, a variety of procedures can be used. The liquids can be mixed together and the meal can be mixed with both in one or a plurality of steps, or the meal can be mixed with the alkali solution first and then with the organic solvent. The meal can also be contacted with an excess of the aqueous alkali; mechanically freed of the amount exceeding that necessary to provide a wet meal having a moisture content of about 20 to 50%, then mixed with the water-soluble volatile organic solvent. Alternatively, the meal can be mixed with a mixture of the aqueous base and part or all of the organic solvent. If part of the solvent is used with the alkali, the remainder can be added in one or more portions, with mechanical removal of non-absorbed liquid between each portion.

If cottonseed meal is first moistened with enough aqueous alkali to provide a meal moisture content of from about 20 to 50%, the wet meal tends to become slightly tacky. If such a tacky meal is evaporatively dehydrated, after about half of the moisture had been removed the meal tends to behave like a doughy mass, and special agitating equipment not ordinarily available in an oilseed mill is required to insure uniform processing. However, the development of this tacky or plastic form of the wet meal has the unique advantage of converting the meal into particles which, after the reduction of their moisture content, are extremely porous and readily filterable. When those particles are freed of liquid and desolventized, they become free-flowing granules which are characterized by a lack of dustiness.

After being mixed with aqueous alkali solution, the wet meal may be heated in a dehydrative atmosphere to temperatures ranging from about 80 to 220° F., with the major part of the heating being conducted at the lower end of the range. When the meal begins to assume the plastic form, and just before the viscosity of the mass increases sharply and the power required to agitate it undergoes a rapid increase, the evaporative dehydration is interrupted by adding the water-miscible volatile organic solvent.

In treating meal in accordance with this procedure, most or all of the advantageous properties imparted to the meal by the development of this tacky or plastic form can be retained without necessity of specialized powerful agitating equipment. For example, when about 1 to 2 parts by weight of the water-soluble, volatile organic solvent is mixed with a mixture of meal and aqueous liquid as soon as or just before the power required to agitate the mixture undergoes a rapid increase, the need for a powerful agitator is substantially eliminated, while most of the advantages accruing from the formation of the plastic form are retained.

Where it is desirable to keep the power requirements at a minimum, the meal can be slurried with an excess of a mixture of the aqueous base and the water-soluble, volatile organic solvent, agitated until the meal particles have the specified moisture content, then freed of excess liquid and contacted with enough additional water-soluble, volatile organic solvent, to reduce the meal moisture content. In this way the whole operation can be conducted in a conventional slurry mixer that requires only a small amount of power.

After the meal has been contacted by both the aqueous alkali and water-soluble, volatile organic solvent, it can, if desired, be freed of non-absorbed liquid by any of the conventional mechanical procedures, such as filtration and/or centrifugation, prior to desolventization. The resulting solvent-damp meal, or meal mixed with absorbable amounts of water-soluble, volatile organic solvent and aqueous base, can be desolventized by the conventional procedures for evaporatively desolventizing mixtures of oilseed particles and volatile liquids. The use of a desolventization procedure in which the maximum temperature of the solids is not more than about 220° F. is preferred.

The following examples are illustrative of the method of practicing this invention.

Example 1

The meal used was a solvent-damp cottonseed meal produced by the hexane extraction of raw cottonseed flakes. When desolventized in the usual way, the meal contained 0.800% free gossypol. A 400 gram sample, dampened with about 300 ml. of hexane, was mixed while stirring slowly in a Model C–10 Hobart food mixer with a solution consisting of 82 ml. of water, 400 ml. of constant boiling 2-propanol (9% by volume of water and 91% 2-propanol) and 4.0 gm. NaOH. This provided 28% moisture on the basis of the wet meal. Stirring was continued at surrounding temperature (80° F.) for 15 minutes.

While the stirring was continued, the vessel containing the wet meal was heated and a light current of air at 80° F. was blown over the top of the mixing bowl, so that the temperature of the mixture rose to 170° F. in 5 minutes. This temperature was held for 10 minutes and then raised to 212° F. in the next 15 minutes. The mixture was then cooled to 100° F. in 3 minutes. The resulting solvent-free meal contained 11% moisture. The finished meal consisted of sandy granules of tan colored meal which were free from the dustiness usually associated with direct-solvent-extracted cottonseed meal. The free gossypol content was 0.041% and the pH was 8.3.

Example 2

A 700 gram sample of the same hexane-extracted meal (after desolventizing) was mixed with a solution consisting of 360 ml. of water, 5.7 grams of NaOH and 1200 ml. of dry 2-propanol. This mixture was stirred for 5 minutes in a Hobart mixer, then 1100 ml. of constant boiling 2-propanol-water mixture (91% 2-propanol by volume) was added and the stirring continued for 5 minutes more. The resulting slurry was filtered and the residual meal was extracted 4 more times with 2-propanol heated to 170° F. The solvent-damp meal was next desolventized in a steam oven at 150° F. The free gossypol content of the meal was 0.007% and its pH was 7.7.

Example 3

A 700 gram sample of the same hexane-extracted meal, after desolventizing, was mixed with a solution of 5.7 grams of NaOH in 360 ml. of water in the Hobart mixer until the material became plastic. One liter of dry 2-propanol was added and the mixture slurried for 5 minutes. Another 1-liter portion of dry 2-propanol was added and the mixture was slurried for 5 minutes more. The mixture was then heated to 170° F. and filtered. Four more hot extractions were made with constant-boiling 2-propanol and the solvent-damp meal was desolventized as in Example 2. The free gossypol content of the finished meal was 0.010% and its pH was 8.0.

While the alkali used in the foregoing examples was sodium hydroxide, other bases can be used, such as the other alkali-metal hydroxides, ammonium hydroxide, water-soluble organic nitrogen bases, alkaline earth metal hydroxide and alkali metal carbonates, bicarbonates or phosphates.

Similarly, the water-soluble organic solvent can be substantially any volatile organic liquid which is miscible with water and which is inert toward cottonseed, cottonseed oil or water. Thus, in addition to 2-propanol used in the examples, suitable organic solvents include: water soluble alcohols, such as methyl, ethyl, propyl and similar alcohols; water-soluble ketones, such as, acetone and methylethylketone; heterocyclic compounds, such as furfural; partially or completely water-soluble esters, such as, ethyl acetate; glycols; and mixtures of any of the foregoing or their mixtures with water. Methyl, ethyl, the propyl alcohols, and the lower molecular weight ketones are particularly suitable.

I claim:

1. A process of reducing the free gossypol content of a desolventized, substantially oil-free, organic solvent-extracted cottonseed meal containing in excess of about 0.4% free gossypol to a free gossypol content not exceeding about .01%, comprising forming a mixture containing said meal, aqueous alkali, and a hot water-miscible, volatile organic solvent, said aqueous alkali being present in the mixture in sufficient quantity to adjust the pH of the wet meal to at least about 7, said water-miscible solvent being present in the mixture in sufficient quantity to adjust the moisture content of the meal to about from 5 to 14%, separating the resulting meal from the mixture, extracting the meal with a hot water-miscible, volatile organic solvent until the free gossypol content of the meal does not exceed about .01%, and then freeing the meal of liquid and desolventizing it, said hot water-miscible, volatile organic solvents being inert to cottonseed, cottonseed oil, and water, and being capable of removing water from said meal, of rupturing the pigment glands contained in said meal, and of extracting the pigments including gossypol released as a result of said rupture of the pigment glands.

2. The process of claim 1 wherein the meal is a hexane-extracted meal.

3. The process of claim 1 wherein the alkali is sodium hydroxide.

4. The process of claim 1 wherein each of the water-miscible, volatile organic solvents is 2-propanol.

5. The process of claim 1 wherein the meal is a hexane-extracted meal, the alkali is sodium hydroxide, and each of the water-miscible, volatile organic solvents is 2-propanol.

6. A process of reducing the free gossypol content of a desolventized, substantially oil-free, organic solvent-extracted cottonseed meal containing in excess of about .04% free gossypol to a free gossypol content not exceeding about .01%, comprising mixing the said meal with a sufficient quantity of aqueous alkali to adjust the pH of the wet meal to at least about 7, adding to the mixture a sufficient quantity of a hot water-miscible, volatile organic solvent to adjust the moisture content of the meal to about from 5 to 14%, separating the meal from the resulting mixture, extracting the meal with a hot water-miscible, volatile organic solvent until the free gossypol content of the meal does not exceed about .01%, and freeing the resulting meal of liquid and desolventizing it, said hot water-miscible, volatile organic solvents being inert to cottonseed, cottonseed oil, and water, and being capable of removing water from said meal, of rupturing the pigment glands contained in said meal, and of extracting the pigments including gossypol released as a result of said rupture of the pigment glands.

7. The process of claim 6 wherein the meal is hexane-extracted meal, the alkali is sodium hydroxide, and each of the water-miscible, volatile organic solvents is 2-propanol.

8. A process of reducing the free gossypol content of a desolventized, substantially oil-free, organic solvent-extracted cottonseed meal containing in excess of about .04% free gossypol to a free gossypol content not exceeding about .01%, comprising mixing the said meal with a sufficient quantity of aqueous alkali to adjust the pH of the wet meal to at least about 7, evaporatively dehydrating the wet meal until just before the viscosity undergoes a sharp increase, mixing the resulting meal with a sufficient quantity of a hot water-miscible, volatile organic solvent to adjust the moisture content of the meal to about from 5 to 14%, separating the meal from the resulting mixture, extracting the meal with a hot water-miscible, volatile organic solvent until the free gossypol content of the meal does not exceed about .01%, and then freeing the resulting meal of liquid and desolventizing it, said hot water-miscible, volatile organic solvents being inert to cottonseed, cottonseed oil, and water, and being capable of removing water from said meal, of rupturing the pigment glands contained in said meal, and of extracting the pigments including gossypol released as a result of said rupture of the pigment glands.

9. The process of claim 8 wherein the meal is a hexane-extracted meal, the alkali is sodium hydroxide, and each of the water-miscible, volatile organic solvents is 2-propanol.

References Cited in the file of this patent

UNITED STATES PATENTS

| | | |
|---|---|---|
| 2,615,808 | Rice | Oct. 28, 1952 |
| 2,726,155 | King et al. | Dec. 6, 1955 |
| 2,740,718 | Eagle et al. | Apr. 3, 1956 |